United States Patent [19]

Catena

[11] 4,235,986
[45] Nov. 25, 1980

[54] ANAEROBIC CURING ADHESIVE COMPOSITION AND PROCESS FOR MAKING SAME

[75] Inventor: William J. Catena, Montville, N.J.

[73] Assignee: National Starch and Chemical Corporation, Bridgewater, N.J.

[21] Appl. No.: 26,091

[22] Filed: Apr. 2, 1979

[51] Int. Cl.³ .............................................. C08F 20/20
[52] U.S. Cl. .................................. 526/320; 526/279; 526/292; 526/301; 526/303; 526/304; 526/305; 526/309; 526/312; 526/313; 526/321; 526/323.1; 526/323.2
[58] Field of Search ................... 526/323.1, 323.2, 279, 526/292, 301, 303, 304, 305, 309, 312, 313, 320, 321

[56] References Cited

U.S. PATENT DOCUMENTS

| | | |
|---|---|---|
| 2,628,178 | 2/1953 | Burnett et al. |
| 3,795,641 | 3/1974 | Lees et al. ............................ 526/217 |
| 4,038,475 | 7/1977 | Frauenglass et al. ............. 526/323.1 |

OTHER PUBLICATIONS
Lal et al, J. Pol. Sci., XXIV, pp. 75–84, (1957).

*Primary Examiner*—Harry Wong, Jr.
*Attorney, Agent, or Firm*—James & Franklin

[57] ABSTRACT

Storage-stable anaerobic curing adhesive compositions useful as anaerobic adhesives and sealants are prepared by first mixing a polymerizable acrylate ester monomer, an inhibitor for free radical polymerization, a chelator, and at least an effective amount of an accelerator system consisting of an organic cyclic sulfimide, preferably saccharin, and an aromatic tertiary amine. The resultant homogeneous mixture is thereafter heated at a temperature of about 45°–100° C. for a period of time sufficient to provide the composition with anaerobic curing properties and a specified minimum amount of active oxygen. In one embodiment, the mixture is stirred at a temperature of 45°–70° C. for 10–24 hours. In another embodiment, the mixture is maintained at an elevated temperature without stirring.

16 Claims, No Drawings

ANAEROBIC CURING ADHESIVE COMPOSITION AND PROCESS FOR MAKING SAME

BACKGROUND OF THE INVENTION

1. Field of the Invention:

This invention relates to storage-stable anaerobic curing adhesive compositions containing polymerizable acrylate ester monomers and to an improved process for the preparation thereof. The compositions are stable for periods of time extending to a half-year or more in the presence of oxygen, but polymerize (cure) rapidly in the absence of air or oxygen, thereby finding use as anaerobic adhesives and sealants.

2. Description of the Prior Art:

Anaerobic curing compositions are well known and described in the prior art. U.S. Pat. No. 2,628,178 describes the preparation of anaerobic adhesives which rely on the oxygenation of certain polyacrylate monomers until at least 0.1% active oxygen is introduced into the monomer. The resultant oxygenated adhesive composition is then stored in contact with a continuous current of air or oxygen until polymerization is desired (at which time polymerization is initiated by the absence of air). This process therefore has the disadvantage that it is totally unsuited to the preparation and distribution of small quantities of adhesive sealants, since it is clearly impracticable to maintain a constant supply of air or oxygen to a large quantity of containers over an extended period of commercial conditions.

U.S. Pat. No. 3,795,641 to Lees et al. teaches that such constant oxygen supply during storage need not be employed when the monomer is initially oxygenated in the presence of minor amounts of an organic tertiary amine and/or an imido compound. This process, however, suffers from several limitations and the subject invention is considered to be an improvement thereon. Thus, aside from economic considerations, there is a measure of inconvenience in supplying and employing the required oxygen-bearing gaseous stream. Moreover, the oxygenation period itself is relatively lengthy, being measured in days in many instances. Additionally, the resulting adhesive is not characterized by a superior degree of stability and cure speed desired in many commercial products.

Other methods have been developed for rendering monomers to possess anaerobic properties without the necessity for oxygenating the monomers. These methods require the presence of specific polymerization initiators such as organic hydroperoxides, peroxy or perester compounds, sulfones, diazonium salts and the like, as disclosed, for example, in U.S. Pat. Nos. 2,895,950; 3,775,385; 3,957,561 and 3,054,480. Additional patents directed to improvements on the above-mentioned catalyzed systems include, for example, U.S. Pat. No. 4,038,475, which teaches the use of a sulfimide and amine as an accelerator system for the peroxy-initiated polymerization of an unoxygenated monomer, the adhesive being stabilized with a selected quinone and containing a chelating agent.

It is an object of the present invention to provide an anaerobic curing adhesive composition which does not require the use of externally added polymerization initiators.

It is another object to provide an anaerobic curing adhesive composition which does not require constant passage of gaseous oxygen either during preparation of the adhesive or during storage thereof.

It is an additional object of the invention to provide an anaerobic curing adhesive composition which is characterized by superior stability and cure speed.

SUMMARY OF THE INVENTION

The above and related objects are achieved in an improved process for preparing a storage-stable adhesive composition capable of curing in the absence of air which process comprises:

(a) forming a homogenous mixture consisting essentially of a polymerizable acrylate ester monomer, from 0.0001 to 0.1% by weight, based on monomer, of an inhibitor for free radical polymerization, from 0.0001 to 0.1% by weight, based on total composition, of a chelator, this amount being dependent on the chelator, and at least an effective amount of an accelerator system consisting of an organic cyclic sulfimide and an aromatic tertiary amine; and (b) maintaining said mixture at a temperature of at least about 20° C., preferably about 45°–100° C., for a period of time sufficient to provide said composition with anaerobic curing properties and to provide said composition with at least 25 ppm. of active oxygen.

The preferred monomers herein are triethyleneglycol dimethacrylate, tetraethyleneglycol dimethacrylate, polyethyleneglycol dimethacrylate and hydroxyethyl methacrylate.

Unexpectedly, in light of the previously described teachings, it has been found that when a mixture of the specified ingredients is merely stirred and/or heated at a temperature within the range defined herein, an adhesive composition is obtained which is storage stable and rapidly cures under anaerobic conditions. The present invention thus represents an improvement over processes of the prior art by providing a comparable or improved adhesive product without employing a stream of oxygen-bearing gas through the mixture or added initiators, recognized as essential in the prior art.

DESCRIPTION OF THE PREFERRED EMBODIMENTS

The monomers employed in accordance with the present process are anaerobically curable monomers having at least one polymerizable acrylate ester group.

The first class of polymerizable monomers useful in the present compositions corresponds to the general formula:

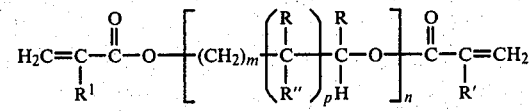

wherein R is selected from the group consisting of hydrogen, methyl ethyl,

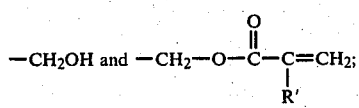

R' is selected from the group consisting of hydrogen, chlorine, methyl and ethyl;

R" is selected from the group consisting of hydrogen, hydroxy, and

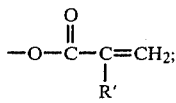

m is an integer of from 1 to 8, and preferably from 1 to 4 inclusive;
n is an integer of from 1 to 20; and
p is 0 or 1.

Monomers useful herein and which come within the above general formula include, for example, ethyleneglycol dimethacrylate, ethyleneglycol diacrylate, polyethyleneglycol diacrylate, tetraethyleneglycol dimethacrylate, diglycerol diacrylate, diethyleneglycol dimethacrylate, pentaerythritol triacrylate, and other polyester diacrylates and dimethacrylates.

The above class of monomers is in essence described in U.S. Pat. No. 3,043,820.

The second class of polymerizable monomers useful in the present compositions corresponds to the general formula:

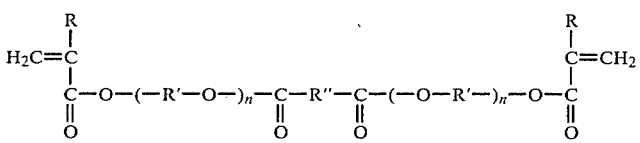

where
R represents hydrogen, chlorine, methyl or ethyl;
R' represents alkylene with 2–6 carbon atoms;
R" represents $(CH_2)_m$ in which m is an integer of from 0 to 8;

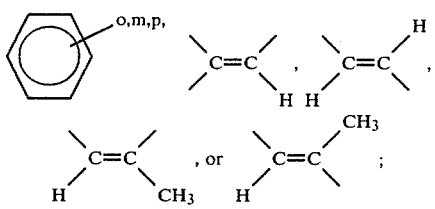

n represents an integer of from 1 to 4.
Typical monomers of this class include, for example, dimethacrylate of bis-(ethyleneglycol) adipate, dimethacrylate of bis-(ethyleneglycol) maleate, dimethacrylate of bis-(diethyleneglycol) phthalate, dimethacrylate of bis-(tetraethyleneglycol) phthalate, dimethacrylate of bis-(tetraethyleneglycol) malonate, dimethacrylate of bis-(tetraethyleneglycol) sebacate, dimethacrylate of bis-(ethyleneglycol) phthalate, dimethacrylate of bis-(tetraethyleneglycol) maleate, and the diacrylates and α-chloroacrylates corresponding to said dimethacrylates, and the like.

The above class of monomers is in essence described in U.S. Pat. No. 3,457,212.

The third class is monomers which are isocyanate-hydroxyacrylate or isocyanate-aminoacrylate reaction products which may be characterized as acrylate-terminated polyurethanes and polyureides or polyureas. These monomers correspond to the general formula:

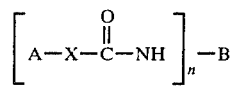

wherein X is selected from the group consisting of

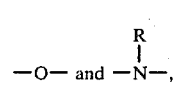

and R is a member selected from the group consisting of hydrogen and lower alkyl radicals of 1 to 7 carbon atoms; A represents the organic residue of an active-hydrogen-containing acrylate ester wherein the active hydrogen has been removed, the ester being hydroxy- or amino-substituted on the alkyl portion thereof and the methyl, ethyl and chlorine homologs thereof; n is an integer from 1 to 6 inclusive; and B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkoxyalkylene), and heterocyclic radicals both substituted and unsubstituted.

Typical monomers of this class include the reaction product of a mono- or polyisocyanate, for example, toluene diisocyanate or methylene bis-phenyl diisocyanate, with an acrylate ester containing a hydroxyl or amino group in the non-acrylate portion thereof, for example, hydroxyethyl methacrylate.

The above class of monomers is in essence described in U.S. Pat. No. 3,425,988.

The fourth class of monomers useful in the present application corresponds to the acrylate diesters of bisphenol-type compounds. These monomers may be described by the formula:

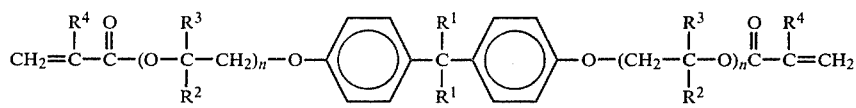

where $R^1$ is methyl, ethyl, carboxyl or hydrogen; $R^2$ is hydrogen, methyl or ethyl; $R^3$ is hydrogen, methyl or hydroxyl; $R^4$ is hydrogen, chlorine, methyl or ethyl; and n is an integer of from 0 to 8.

Representative monomers of the above-described class include dimethacrylate and diacrylate esters of 4,4'-bishydroxy-ethoxy-bisphenol A; dimethacrylate and diacrylate esters of bisphenol A; etc. These monomers are essentially described in Japanese Pat. Publication 70-15640.

The fifth class of monomers consists of monofunctional acrylate and methacrylate esters and the hydroxy-, amido-, cyano-, chloro-, and silane-substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decyl methacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be anaerobically curable monomers having one or more polymerizable acrylate or substituted acrylate ester groups as a common, unifying characteristic. The preferred monomers are those in the first and fifth classes above described.

In the production of anaerobic curing adhesive compositions characterized by exceptionally high bond strength in the resultant cured polymer, the particular monomer employed may be chosen so as to contain an alcoholic or other relatively polar group substituted thereof. Examples of such polar groups in addition to the hydroxyl group include amino, amido, cyano, carboxy, mercapto and halogen polar groups. Monomers containing hydroxyl groups and/or labile hydrogen atoms are preferred. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

For best results in terms of adhesive activity, the monomers herein are preferably employed in a purified state. However, this is not a strict requirement, and the monomers may be comprised of commercial grades in which inhibitors, stabilizers, or other additives or impurities may be present, as well as those monomers prepared in the laboratory or on a pilot-plant scale, provided that such additives or impurities do not interfere with the functions of the essential ingredients of the adhesive and do not reduce the activity and/or stability of the adhesive to unacceptable levels.

In the preparation of the anaerobic curing compositions herein, it is possible to employ a mixture of acrylate ester monomers rather than a single acrylate ester as the required polymerizable monomer. There may also be utilized, in combination therewith, other non-acrylic, ethylenically unsaturated copolymerizable co-monomers such as unsaturated hydrocarbons, unsaturated esters and ethers, vinyl esters, and the like. Typical optional comonomers include vinyl acetate, methyl vinyl ether, methyl vinyl ketone, poly(ethylene maleate), allyl alcohol, allyl acetate, 1-octane, styrene, etc. Preferably, the total optional non-acrylic monomer(s) will constitute no more than 50% by weight of the monomeric composition, and most preferably no more than 30%.

In accordance with the present invention, an accelerator system consisting of an organic cyclic sulfimide and an aromatic tertiary amine must be present in the composition. The cyclic sulfimide is defined herein as a compound of the formula:

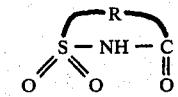

wherein R is a divalent aromatic nucleus of 6 carbon atoms which bonds the sulfimide group in a heterocyclic ring or a polynuclear heterocyclic ring. Such cyclic sulfimides are well known in the art as accelerators which improve the curing and storage properties of anaerobic adhesives. Among the cyclic sulfimides suitable herein, o-benzoic sulfimide (saccharin) is most preferred.

The other necessary component of the accelerator system of the present composition, the aromatic tertiary amine, is already known to accelerate cure of anaerobic adhesives in conjunction with saccharin (see, e.g., U.S. Pat. Nos. 3,218,305 and 3,795,641). Suitable aromatic tertiary amines herein include the N,N-dialkyl aryl amines and N,N-dialkyl substituted aryl amines of the general formula:

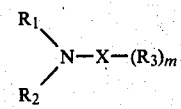

wherein X represents a carbocyclic aromatic nucleus selected from the group consisting of phenyl and naphthyl radicals; $R_1$ and $R_2$ are lower alkyl radicals of 1 to 4 carbon atoms, inclusive; $R_3$ is a member selected from the group consisting of lower alkyl and lower alkoxy radicals of 1 to 4 carbon atoms, inclusive; and m is an integer of from 0 to 7, inclusive. Examples of such amines include N,N-dimethylaniline, N,N-diethylaniline, p-isopropyl-N,N-dimethylaniline, p-methoxy-N,N-dimethylaniline, N,N-dimethyl-p-toluidine, N,N-dimethyl-o-toluidine, N,N-dimethyl-m-toluidine, N,N-diethyl-p-toluidine, 2,4-, 3,4- and 3,5-dimethyl-N,N-dimethylaniline, and the like, as well as mixtures thereof. In general, amines with a low degree of volatility and toxicity are preferred, with a mixture of N,N-dimethyl-p-toluidine and N,N-diethylaniline being most preferred.

It has been found that if either the sulfimide or the aromatic tertiary amine is excluded from the mixture herein, a suitable product having the desired activity and stability is not obtained. In addition, aromatic secondary amines or aliphatic amines cannot be substituted for the aromatic tertiary amines.

As to proportions, the sulfimide and aromatic tertiary amine are employed in amounts which are interdependent, and also dependent on the type of monomer employed, the type and amount of inhibitor and chelator used, the solubility of the sulfimide and amine, and the properties desired in the final adhesive. The maximum amount added depends on the saturation level of the monomer. The lower limit on the concentration of sulfimide is the minimum which is effective in achieving the desired results. The amount of sulfimide employed generally ranges from about 0.01 to about 12% by weight of the total composition. The aromatic tertiary amine is employed in amounts which also depend on compatibility with or solubility in the monomer, but this amount must be at least effective in providing the adhesive with the necessary properties. Ordinarily, the concentration of tertiary amine ranges from about 0.01 to 3%, by weight of the total composition, depending on the monomer employed. It will be obvious to those skilled in the art to limit these relative proportions so that separation of precipitation will not occur during storage. Specific proportions are illustrated in the examples set forth hereinbelow.

An essential requirement in obtaining the excellent storage stability which characterizes the products herein is that the adhesive mixture contain about 0.0001 to 0.1%, preferably 0.0025 to 0.05%, by weight, based on monomer, of an inhibitor of free radical polymerization. Suitable such inhibitors include those which are conventionally employed as stabilizers in anaerobic adhesives such as hydroquinones, benzoquinones, naphthoquinones, p-t-butyl catechol, phenothiazine, sterically hindered phenols, etc. With certain of these inhibitors, a longer heating period and/or larger amounts of sulfimide may be necessary to obtain an adhesive composition having good performance. While the monomer will normally be obtained with a certain amount of inhibitor present therein, additional inhibitor may be added as necessary at any time to bring the amount up to the required level. In the case where the monomer is subjected to elevated temperatures, the required amount of inhibitor should be present prior to heating of the mixture.

The presence of a chelating agent (chelator) has also been found necessary to provide the compositions herein with sufficient stability. For purposes herein, a chelator is defined as a compound which is capable of complexing with a metal atom through coordination bonds between the metal and the liquid atoms of the chelator to form a heterocyclic ring. Although many chelating agents are usable herein, the preferred chelators are oxalic acid and those compounds having a combination of oxygen and nitrogen ligand atoms such as 8-hydroxyquinoline and the $\alpha$-and beta-aminocarboxylates such as, e.g., tetrasodium ethylenediamine tetraacetic acid ($Na_4ETDA$). Particularly preferred chelators herein are oxalic and $Na_4ETDA$. In general, the chelator useful in this invention should be soluble in the monomer.

An example of a type of chelator which is not useful herein is the class where all ligand atoms are nitrogen atoms of the $>C=N$—type, such as, e.g., dipyridyl, as described in U.S. Pat. No. 4,038,475.

The amount of chelator employed depends mainly on the type of chelator, but also to a minor extent on the amounts and types of other ingredients in the composition. Amounts as low as about 0.0001% to as high as about 0.1% by weight of the total composition may be employed, depending on the particular chelator added. It is noted that with certain chelators, the amount thereof must not exceed about 0.01% by weight to obtain an adhesive having good properties. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.01% by weight.

Since the cyclic sulfimide, aromatic tertiary amine and chelator employed herein are generally very soluble in the acrylate- and methacrylate-based monomeric systems, it is usually unnecessary to employ a solvent or diluent in order to produce a satisfactory sealant composition. If, however, the presence of a solvent is desired, then any solvent or diluent which dissolves the inhibitor, chelator, sulfimide and tertiary amine, as well as any accelerators which may be present and are soluble in the monomer, may be employed. Common solvents are described in the literature and include, for example, alkanols, such as methanol, ethanol and butanol, the substituted or unsubstituted formamides such as formamide and N,N-dimethyl formamide, and polyester diluents.

One additive which may be employed for purposes of increasing stability of the composition is an aliphatic tertiary amine, such as trialkylamine wherein each alkyl group contains 1-4 carbon atoms and may have hydroxyl substitution. Suitable such amines are, for example, trimethylamine, triethylamine, diethylpropylamine, tripropylamine, tri-isopropylamine, tri-n-butylamine, tri-iso-butylamine, tri-t-butylamine, triethanolamine, ethyldimethylamine and 2-diethylaminoethanol. Such aliphatic amines, if added, must be present in amounts not exceeding the molar concentration of the cyclic sulfimide in the monomeric composition. If a stoichiometric excess of these amines is present, a suitable adhesive composition will not be obtained. It is to be understood that these aliphatic amines cannot be used as substitutes for the aromatic tertiary amines required herein, as the former alone will not provide the needed activity for the adhesive. They are therefore employed only in conjunction with the aromatic amines.

In the production of the novel anaerobic curing compositions herein it may also be desirable to employ conventional antioxidants to prolong the shelf life of the composition further. In particular, it may be preferred to add a sterically hindered phenol, e.g., butylated hydroxytoluene (BHT), butylated hydroxyanisole (BHA), or such antioxidants as are commercially available under the registered trademarks IONOX 220 (Shell), SANTONOX R (Monsanto), IRGANOX 1010, and IRGANOX 1076 (Ciga-Geigy), and the like.

Optionally, the compositions may also contain a minor amount, up to 50% by weight, of a polymeric thickener, for example, a polymer or prepolymer or low or high molecular weight. Illustrative of such polymeric thickeners is a commercially available methacrylate polymer sold by E. I. duPont de Nemours and Company, under the trademark ELVACITE or by Rohm and Haas, under the registered trademark ACRYLOID, as well as styrene-methyl methacrylate copolymers and polybisphenol A maleate (sold by ICI Americas Inc. under the registered trademark ATLAC). There can also be added inert filling materials such as finely divided silica, montmorillonite, clay, bentonite, and the like. In particular, the use of micronized silica results in paste-like, thixotropic compositions.

The compositions of this invention may also incorporate, as accelerators of polymerization, organic acids, preferably organic monocarboxylic acids such as benzoic acid, paratoluic acid or naphthyl acetic acid, or their corresponding anhydrides. Anhydrides of dibasic aromatic acids, such as phthalic or terephthalic acid, may also be used. Aliphatic acids, are, in general, less satisfactory as accelerators for the compositions herein when the compositions are employed on many nonferrous metal surfaces. However, these acids have some utility when the compositions are employed on ferrous metals and may conveniently be employed in conjunction with aromatic acids for bonding non-ferrous surfaces.

Improved shear strength and impact strength may be obtained in the present adhesive composition by the addition thereto of a rubber having one or more reactive centers as described in U.S. Pat. No. 4,138,449. Suitable such rubbers include polybutadienes, urethanized polybutadiene, halogenated polybutadienes, chlorosulfonated polyethylenes, and butadiene-acrylonitrile copolymer esters of acrylic acid and 2-alkyl-substituted acrylic acid.

There may also be present in the compositions plasticizers such as, for example, dibutyl phthalate or triethylene glycol and/or tackifying resins such as styrene/alpha-methylstyrene copolymer (trademark KRISTALEX of Hercules). Other optional ingredients include inorganic thickeners and cut-glass fibers, as well as visible dyes or ultraviolet fluorescent dyes and/or fluorescent agents. The dyes serve to increase the visibility of the normally colorless or very pale compositions so that treated surfaces can be readily distinguished from untreated surfaces. Typical dyes include those of the anthraquinone series such as 1,4-di-monomethylaminoanthraquinone, 1,4-di-monoisopropylaminoanthraquinone, and 1,4-di-monoethylaminoanthraquinone. Dyestuffs containing unsubstituted hydroxyl groups or unsubstituted amino groups are in general to be avoided, since they exert a marked inhibiting influence on the polymerization of the compositions.

As mentioned above, the compositions herein require no externally added polymerization initiator such as hydrogen peroxide, peroxy compounds, sulfones or diazonium salts to promote polymerization of the monomer. It is unexpected that a commercially acceptable anaerobic composition can be formulated by the proper balance of sulfimide and aromatic tertiary amine to provide the requisite activity and bond strength together with shelf stability, without the use of any of the polymerization initiators or the passing of an oxygen-bearing stream through the mixture as taught by the prior art.

In the preparation of the present anaerobic curing compositions (before the heating step if heating is employed), it is first necessary to stir the desired amounts of tertiary amine and sulfimide thoroughly with the selected acrylate ester monomer(s) usually containing an inhibitor until all components are dissolved to form a homogeneous mixture. It may take up to seven hours or more of stirring to effect dissolution of the ingredients, depending on the amounts and types of ingredients and the diluent employed, if any. The chelator and any optional ingredients can be premixed into the monomer or alternatively admixed into the prepared composition or during subsequent stirring and/or heating of the monomeric mixture. The chelator is preferably added with the amine and sulfimide.

After the components are thoroughly mixed together, the resultant homogeneous blend is subjected to stirring and/or heating at a temperature and for a period of time sufficient to provide the composition with anaerobic curing properties; i.e., rapid and spontaneous polymerization to the solid state upon the exclusion of air or oxygen while remaining in the liquid state so long as contact with air or oxygen is maintained. The reaction temperature depends mainly on the type of monomer employed, the amounts and types of ingredients added, the rate of stirring employed, if any, and the amount of stability and activity desired in the final adhesive. In any case, the temperature should not be below room temperature (about 20° C., but preferably 25° C.) to obtain a product having acceptable properties in a reasonable period of time. The maximum temperature is ordinarily about 98°–100° C. but may be several degrees higher depending on the amount and type of amine employed, the monomer, and the heating time. The heating must be carried out at a temperature such that no deleterious effects are observed in the final product, and such that the product has the minimum active oxygen content specified herein. The preferred heating temperature herein is 45°–70° C. The period of time necessary for heating will depend, e.g., on the temperature, ingredients, and the rate of stirring, if any, but generally ranges from about 4 to about 30 hours, preferably 10–24 hours. The time may be extended beyond 30 hours if necessary to improve the activity of the adhesive. If the heating period is too long, however, the stability of the adhesive may be adversely affected. It is also within the scope of this invention, although less desirable, to allow the homogeneous mixture to stand at room temperature without stirring; nevertheless, the amount of time necessary for the adhesive to develop anaerobic curing properties will be increased proportionately, and in some cases may be three months or longer.

The formation of the adhesive is preferably monitored during the heating and/or stirring period by determination of the active oxygen content of the intermediates and the final product. To this end, a small sample of the developing adhesive is removed and analyzed for active oxygen content as described further hereinbelow. Generally, the amount of active oxygen introduced into the monomeric mixture is between about 50 ppm. and about 1000 ppm., and preferably at least 100 ppm. For purposes herein, the minimum amount of active oxygen necessary to achieve sufficient stabilization of the adhesive is 25 ppm., based on the total composition.

During the heating and/or stirring period no oxygen need be actively passed through the mixture such as by bubbling an oxygen-bearing gas therethrough. The heating may be carried out in a conventional reaction vessel for anaerobic adhesives equipped with stirrer or may be carried out in a suitable reactor with no stirring. Stirring of the mixture is preferred because ambient oxygen becomes mixed into the vortex created by the stirring, resulting in shorter reaction times.

Depending on the particular ingredients and the temperature and time allowed for heating and/or stirring, the composition herein may be stored at room temperature for periods of months and in some cases even years prior to actual use without any evidence of gelling. It is only necessary that there be present a moderate amount of air or oxygen which is provided conveniently by a small volume of air in a properly shaped container, preferably made of polyethylene or a similar material which is permeable to air. However, upon exclusion from air by placement between adjacent surfaces, the sealant composition will rapidly polymerize to form a strong bond, which polymerization can be further accelerated by use of elevated temperatures, although use of elevated temperatures is not necessary since these compositions produce strong bonds within a matter of minutes.

The anaerobic polymerization of the compositions herein is accelerated by the surface of certain metals including iron, mild steel, cadmium, cobalt and manganese. Certain other metals, including aluminum, zinc and copper, have a lower catalytic activity. Non-metallic surfaces such as glass do not catalyze polymerization. In the bonding of surfaces of low catalytic activity, it may be advantageous to use a primer such as an aldehyde-amine condensate, a derivative of a catalyst metal such as ferric chloride, cobalt naphthanate or manganese resinate, or an aerosol-propelled primer based on a sulfone and an organic salt of copper as described in U.S. Pat. application Ser. No. 953,054, filed Oct. 19, 1978 to Ray-Chaudhuri et al.

It will be obvious that traces of grease, lacquers and the like, as well as electroplated coatings of non-catalytic metals, on the surfaces of otherwise catalytic metals may retard polymerization or decrease the bond strength obtainable. Where bonds of maximum strength are required, it is preferred to remove traces of grease or lacquer, conveniently by suitable solvent treatment, and, in the case of metal-plated surfaces, to employ a primer such as those mentioned above.

The compositions herein are particularly suitable for use as locking compounds for cementing nuts to threaded shafts, bushes to bush housings and the like. In many cases they can be applied either before or after assembly of the components. For application after assembly, an unthickened composition which is sufficiently fluid to penetrate between the components is preferred. If the compositions are applied to components prior to assembly, the unassembled, coated components can be stored in air for considerable periods up to several months, since the contact with atmospheric oxygen is sufficient to inhibit polymerization even when the coated surface is anaerobically catalytic such as iron. When such previously coated components are assembled so as to exclude air, however, polymerization will be initiated and a considerable bond strength will normally develop within a few hours, even at room temperature.

The following test procedures were employed in the examples below:

DETERMINATION OF ACTIVE OXYGEN CONTENT

About 0.1 to 0.5 g. of the sample is weighed in a small glass flask to which is added about 10 ml. glacial acetic acid. A pellet of dry ice about the size of a large pea is placed in the solution to dispel air. When about one-half of the dry ice has evaporated, 1 ml. of a saturated aqueous solution of potassium iodide is added and the flask swirled to dissolve the ingredients. A loosely fitting cork is placed in the flask to retain the inert atmosphere and the mixture is heated for about 15 minutes in a 60° C. oven. Immediately after removal of the flask from the oven, 10 ml. of water is added to prevent interference of air. The warm solution is promptly titrated with 0.1 N sodium thiosulfate until the color of the iodine just disappears. Starch indicator should not be added. The active oxygen content is obtained using the formula:

$$\frac{(\text{ml. of } 0.1\text{N Na}_2\text{S}_2\text{O}_3) \times (0.08 \times 10^4)}{\text{weight (g.) of sample}} = \text{ppm. of active oxygen}$$

DETERMINATION OF SHELF STABILITY

One of two methods is employed as follows:

A. A total of 250 cc. of the sealant is added to a polyethylene container, which is then placed in an oven at 50° C. for a minimum of one day. After this period, the condition of the sealant is noted. The time necessary for the sealant to separate out as a precipitate is a measure of the room-temperature stability of the adhesive. As an approximate correlation between oven-aging and aging at room temperature, it is believed that a sealant still free from gelling after ten days of accelerated aging at 50° C. will be stable at ambient temperatures in the presence of oxygen for at least about one year.

B. A total of 5 cc. of the sealant is added to a test tube, which is then placed in a bath heated to 28° C. for a minimum of 30 minutes. As a correlation with room-temperature stability, 30 minutes of aging in the bath is approximately equivalent to one year of aging at room temperature.

DETERMINATION OF AVERAGE PREVAILING TORQUE

The strength of the bond between threaded members is determined as follows: About two or three drops of each composition are placed on the exposed threads of separate $\frac{3}{8} \times 24$ mild steel bolts (degreased), and immediately thereafter a nut (degreased) with mating threads is run onto the bolt so that the nut is directly in the thread area of the applied composition. The sealant is allowed to set and cure at room temperature for a specified period of time, normally $\frac{1}{2}$, 1 or 24 hours, and the strength of the bond formed between the nut and bolt is then measured. The average prevailing torque for the bond is the average amount of torque required for a wrench to turn a series of three bolts for $\frac{1}{4}$ turn, $\frac{1}{2}$ turn, $\frac{3}{4}$ turn and a full turn. Commercially, a bolt sealant developing an average torque of 12 inch-pounds after 24 hours of cure is considered satisfactory.

The following examples serve to illustrate further the embodiments of the present invention. In the examples, all parts and percentages are given by weight and all temperatures in degrees Celsius unless otherwise noted.

EXAMPLE 1

A wide-mouth, quart-size bottle of high-density polyethylene, fitted with a non-metallic stirrer and covered with polyethylene film, was charged with the following ingredients in the given amounts:

| Ingredients | Approximate Weight Percent |
|---|---|
| Triethyleneglycol dimethacrylate containing 0.008% hydroquinone as stabilizer | 98.20 |
| Saccharin | 1.49 |
| N,N-Dimethyl-p-toluidine | 0.30 |
| Dye | 0.005 |
| Fluorescent agent | 0.005 |
| | 100.000 |

To this composition was added 26 ppm. (0.0026% based on total composition) by weight of oxalic acid as chelator. The mixture was stirred until all components dissolved and was then heated with stirring at 60°–65° C. After about 24 hours of heating, the resultant composition had an active oxygen content of about 240 ppm. On testing as above described, the composition was found to have an average prevailing torque of 373 in.-lb. after a 24-hour cure.

EXAMPLES 2–6

These examples illustrate the use of various monomers in preparing the compositions of this invention.

Five formulations were prepared as in Example 1 using the ingredients and amounts thereof given in Table I. All of the compositions contained about 25 ppm of oxalic acid. The active oxygen contents of formulations 2, 3 and 6 were determined, and the average prevailing torque of each formulation after 24 hours of curing was measured.

TABLE I

| Ingredients (% by weight): | Examples | | | | |
|---|---|---|---|---|---|
| | 2 | 3 | 4 | 5 | 6 |
| Tetraethyleneglycol dimethacrylate containing 0.01% phenothiazine | 97.7 | — | — | — | — |
| Trimethylolpropane trimethacrylate containing 0.008% hydroquinone | — | 97.7 | — | — | — |
| Polyethyleneglycol dimethacrylate containing 0.008% hydroquinone | — | — | 98.69 | — | — |
| Hydroxyethylmethacrylate containing 0.008% hydroquinone | — | — | — | 97.7 | 8.88 |
| Reaction product of hydroxyethyl methacrylate and methylene-bis-phenyl diisocyanate* containing 0.005% 1,4-naphthoquinone | — | — | — | — | 88.82 |
| Saccharin | 1.5 | 1.4 | 1.0 | 1.5 | 1.5 |
| N,N-Dimethyl-p-toluidine | 0.3 | 0.4 | 0.3 | 0.3 | 0.3 |
| Diethylaniline | 0.5 | 0.5 | — | 0.5 | 0.5 |
| Dye | — | — | 0.005 | — | — |
| Fluorescent agent | — | — | 0.005 | — | — |
| Active oxygen content (ppm.) | 227 | 104 | ** | ** | 117 |
| Average prevailing torque (in.-lb.) | 381 | 375 | 348 | 325 | 435 |

*Prepared by reacting 16.6 moles hydroxyethyl methacrylate with 2.16 moles methylene-bis-phenyl diisocyanate in the presence of 1.03 moles polypropylene glycol (apx. M.W. 700) and 0.79 moles polypropylene glycol(apx. M.W. 400) at 100° C. for 3 hours.
**Not determined.

EXAMPLE 7

This example illustrates the importance of adding both a cyclic sulfimide and an aromatic tertiary amine to obtain the adhesive compositions characteristic of this invention.

Four formulations designated A-D were prepared as in Example 1 using the ingredients and amounts thereof indicated in Table II. Each formulation contained about 25 ppm. oxalic acid. The active oxygen content of each composition was measured, as well as the average prevailing torque after 24 hours of curing.

TABLE II

| Ingredients (% by weight): | Formulation | | | |
|---|---|---|---|---|
| | A* | B* | C | D |
| Tetraethyleneglycol dimethacrylate containing 0.008% hydroquinone | 98.5 | 99.7 | 98.7 | 97.7 |
| Saccharin | 1.5 | — | 1.5 | 1.5 |
| N,N-Dimethyl-p-toluidine | — | 0.3 | 0.3 | 0.3 |
| Diethylaniline | — | — | — | 0.5 |
| Active oxygen content (ppm.) | 5 | 6 | 250 | 260 |
| Average prevailing torque (in.-lb.) | 0 | 0 | 375 | 425 |

*These formulations are included for comparative purposes.

It can be seen that both a tertiary amine and a sulfimide are necessary in preparing an adhesive having a high active oxygen content and good bond strength. When Formulation D was aged at 82° C. as described above in the test for stability, gelling did not occur until after 5 hours.

When the N,N-dimethyl-p-toluidine in Formulation C was replaced in an equal amount by N-methyl-p-toluidine, n-hexylamine, 1,2-dimethylimidazole and piperazine, respectively, the resultant compositions (which were prepared as in Example 1) contained very little active oxygen and thus had inadequate activity.

EXAMPLES 8–13

These examples illustrate the use of several different types of amines as well as N,N-dimethyl-p-toluidine in preparing the compositions of this invention.

Six formulations were prepared using 100 g. of tetraethyleneglycol dimethacrylate (stabilized with 0.008% hydroquinone), 0.0025% oxalic acid, 0.5% saccharin, and the amount and type of amine indicated in Table III. Formulations 8–12 were prepared at 65° C. according to the procedure of Example 1, while Formulation 13 was prepared by mixing the ingredients until they dissolved and then transferring the mixture in the polyethylene container to an oven at 50° C., where the mixture was allowed to stand for about 24 hours. The active oxygen contents of each sample were measured during preparation thereof at 6 hours and then at 22 hours. The average prevailing torque was measured for each composition after a 178-hour cure and after a 24-hour cure. The results are given in Table III.

TABLE III

| Example | Amine | Weight of Amine (g.) | Reaction Temperature (°C.) | Active Oxygen Content(ppm.) | | Average Prevailing Torque(in.-lb) | |
|---|---|---|---|---|---|---|---|
| | | | | 6 hr. | 22 hr. | ½-hr. cure | 24-hr. cure |
| 8 | 2,4-dimethyl-N,N-dimethyl-p-toluidine | 0.41 | 65 | 150 | 350 | 157 | 356 |
| 9 | 3,5-dimethyl-N,N-dimethyl-p-toluidine | 0.37 | 65 | 40 | 57 | 204 | 380 |
| 10 | N,N-dimethylaniline | 0.33 | 65 | 32 | 48 | — | 356 |
| 11 | p-isopropyl-N,N-dimethylaniline | 0.44 | 65 | 146 | 174 | 273 | 383 |
| 12 | N,N-dimethyl-p-toluidine | 0.37 | 65 | 280 | — | 281 | 367 |
| 13 | N,N-dimethyl-p-toluidine | 0.37 | 50 | 145 | 175 | 285 | 429 |

When about 9 g. of the monomer in Formulation 12 is replaced by a liquid vinyl-terminated butadiene-acrylonitrile rubber of average molecular weight 3,400 (Registered Trademark HYCAR VTBN), a composition of comparable activity is obtained.

EXAMPLE 14

This example illustrates the effect of increasing the concentration of amine or saccharin on the properties of the adhesive.

Formulations A–C in Table IV were prepared as in Example 1 using 0.3% N,N-dimethyl-p-toluidine, 0.5% diethylaniline, about 0.0025% oxalic acid, and the indicated amounts of saccharin and tetraethyleneglycol dimethacrylate monomer (containing 0.008% hydroquinone).

Formulations A'–C' were prepred as in Example 1 using 1.5% saccharin, 0.5% diethylaniline, about 0.0025% oxalic acid, and the indicated amounts of N,N-dimethyl-p-toluidine and tetraethyleneglycol dimethacrylate monomer (containing 0.008% hydroquinone). The active oxygen content of each composition was determined after 26 hours and is indicated in Table IV.

TABLE IV

| Formulation | Amount of Monomer (% by weight) | Amount of Saccharin (% by weight) | Amount of Toluidine (% by weight) | Active Oxygen Content (ppm.) |
|---|---|---|---|---|
| A | 98.7 | 0.5 | 0.3 | 180 |
| B | 97.7 | 1.5 | 0.3 | 268 |
| C | 97.2 | 2.0 | 0.3 | 209 |
| A' | 97.9 | 1.5 | 0.1 | 135 |
| B' | 97.7 | 1.5 | 0.3 | 268 |
| C' | 97.4 | 1.5 | 0.6 | 327 |

The results show that increasing the amine concentration while holding saccharin concentration constant increases the active oxygen content of the composition.

EXAMPLE 15

This example illustrates the preparation of the adhesive herein at room temperature.

A formulation was prepared which contained all of the ingredients of Example 2 except that the commercially stabilized monomer was additionally stabilized with 0.005% 1,4-naphthoquinone. The ingredients were stirred in a covered polyethylene container at room temperature for about 24 hours. The resultant composition, on testing, was found to have an average prevailing torque of 409 in.-lb. after a 24-hour cure.

EXAMPLE 16

This example illustrates the preparation of the adhesive herein at elevated temperatures.

The ingredients of the composition of Example 2 were heated for 24 hours at 80° C. instead of at 65° C. On testing the resultant composition was found to have an average prevailing torque of 368 in.-lb. after a 24-hour cure.

The same ingredients as employed above were heated for 5 hours at 85°–88° C. On testing, the resultant composition was found to have an average prevailing torque of 334 in.-lb. after a 24-hour cure.

EXAMPLE 17

This example illustrates the preparation of an adhesive composition compounded with a thickener in accordance with this invention.

A mixture of the following ingredients was heated for about 24 hours at 65° C.:

| Ingredients | Approximate Weight Percent |
|---|---|
| Tetraethyleneglycol dimethacrylate containing 0.01% phenothiazine | 53.593 |
| ATLAC 382E (Registered Trademark of ICI Americas Inc. for polybisphenol A maleate solid) | 43.89 |
| Oxalic acid | 0.002 |
| Dye | 0.01 |
| Fluorescent agent | 0.005 |
| Saccharin | 1.5 |
| Diethylaniline | 1.0 |

On testing, the resultant composition was found to have an average prevailing torque of 331 in.-lb. after a 24-hour cure.

EXAMPLE 18

This example illustrates the use of several chelators other than oxalic acid in preparing the compositions of this invention.

The formulations A–F in Table V were prepared as in Example 1 using the indicated ingredients and amounts thereof. Each formulation was tested for average prevailing torque after 24 hour cure and also for stability by aging at 50° C. The results are given in the table.

TABLE V

| Ingredients (% by weight): | A* | B | C* | D | E | F |
|---|---|---|---|---|---|---|
| Tetraethyleneglycol dimethacrylate containing 0.01% phenothiazine | 97.7 | 97.1 | 97.1 | 97.7 | 97.7 | 97.7 |
| Saccharin | 1.5 | 1.5 | 1.5 | 1.5 | 1.5 | 1.5 |
| N,N-dimethyl-p-toluidine | 0.3 | 0.3 | 0.3 | 0.3 | 0.3 | 0.3 |
| Diethylaniline | 0.5 | 0.5 | 0.5 | 0.5 | 0.5 | 0.5 |
| Na₄EDTA | — | 0.6** | — | — | — | — |
| 8-Hydroxyquinoline | — | — | 0.03** | 0.005 | 0.0025 | 0.001 |
| Average prevailing torque(in.-lb.) | 359 | 269 | 4 | 205 | 239 | 352 |
| Stability at 50° C. (days) | 1 | >10 | >10 | >10 | >10 | >10 |

*These formulations are included for comparative purposes.
**The chelator was added in an amount of 0.6 g. as a 5% solution of chelator in a solvent of 80 volumes methanol to 20 volumes water to give a chelator concentration of 0.03%.

The results indicate that the amount of chelator used to obtain good bond strength is highly dependent on the type of chelator employed. The chelator clearly enhances the stability of the adhesive composition.

EXAMPLE 19

This example shows that stirring of the mixture is not necessary to obtain the composition herein.

The ingredients of the formulation of Example 2 were mixed together and stirred overnight at room temperature. The resulting mixture was thereafter tested for active oxygen and average prevailing torque, separated into eight polyethylene containers, and placed in an oven at 50° C. Each day thereafter, a bottle was removed from the oven and tested for active oxygen content and prevailing torque after a ½ hour and 24-hour cure. As a comparison, the tetraethyleneglycol dimethacrylate monomer itself was tested for active oxygen and prevailing torque prior to being mixed with the other ingredients. The results are indicated in Table VI.

TABLE VI

| Days in oven at 50° C. | Active Oxygen Content (ppm.) | Average Prevailing Torque (in.-lb.) | |
|---|---|---|---|
| | | ½ hour cure | 24 hour cure |
| 0 (monomer) | 40 | 0 | 0 |
| 0 (mixture) | 42 | 0 | 17 |
| 1 (mixture) | 56 | 125 | 231 |
| 2 (mixture) | 71 | 125 | 294 |
| 3 (mixture) | 68 | 98 | 339 |
| 4 (mixture) | 87 | 124 | 339 |
| 7 (mixture) | 104 | 219 | 317 |
| 8 (mixture) | 127 | 185 | 291 |
| 9 (mixture) | 132 | 221 | 276 |
| 10 (mixture) | 140 | 214 | 265 |

It can be seen from the results that heating of the mixture in an oven without stirring is effective in obtaining a composition with the properties characteristic of this invention.

EXAMPLE 20

An aerosol primer containing a sulfone and an organic salt of copper was sprayed on one surface of each of two glass slides. One drop of the adhesive formulation of Example 6 was thereafter applied to the surface of one slide and the slides were immediately joined. The curing time (the time after which the slides could no longer be separated without breaking) was found to be 20 seconds.

EXAMPLE 21

Two formulations similar to Examples 2–6 are prepared using as monomer poly(butylene maleate) dimethacrylate and bis(methacryloxy-2-hydroxypropyl) ether of Bisphenol A, respectively, and yield roughly comparable results.

It is summarized that the present invention provides an anaerobic curing adhesive composition which is characterized by superior stability and cure speed, the adhesive being prepared from a homogeneous mixture formed without any added polymerization initiator and which does not require constant passage of gaseous oxygen therethrough either during preparation of the adhesive or during storage thereof.

Now that the preferred embodiments of the invention have been described in detail, various modifications and improvements thereon will become readily apparent to those skilled in the art. Accordingly, the spirit and scope of the present invention are to be limited only by the appended claims, and not by the foregoing specification.

What is claimed is:

1. An improved process for preparing a storage-stable adhesive composition capable of curing in the absence of air which process comprises:
   (a) forming a homogeneous mixture consisting essentially of a polymerizable acrylate ester monomer, from 0.0001 to 0.1% by weight, based on monomer, of an inhibitor for free radical polymerization, from 0.0001 to 0.1% by weight, based on total composition, of a soluble chelator having ligand atoms other than nitrogen ligand atoms of the ≦C=N-type, this amount being dependent on the chelator, and at least an effective amount of an accelerator system consisting of an organic cyclic sulfimide and an aromatic tertiary amine; and
   (b) heating said mixture at a temperature of about 45°–100° C. for a period of time sufficient to provide said composition with anaerobic curing properties and to provide said composition with at least 25 ppm. active oxygen, said process not requiring the use of any externally added polymerization initiator and said process being conducted without constant passage of gaseous oxygen through the adhesive during preparation thereof.

2. The process of claim 1 wherein said polymerizable monomer is

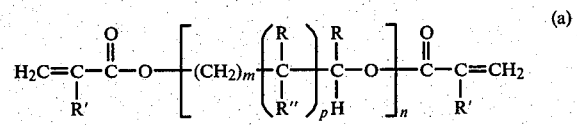

wherein R is selected from the group consisting of hydrogen, methyl, ethyl,

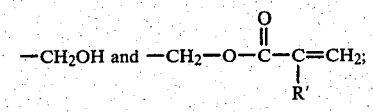

R' is selected from the group consisting of hydrogen, chlorine, methyl and ethyl;
R'' is selected from the group consisting of hydrogen, hydroxy, and

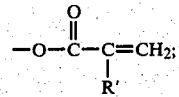

m is an integer of from 1 to 8;
n is an integer of from 1 to 20; and
p is 0 or 1; or
   (b) monofunctional acrylate and methacrylate esters or the hydroxy-, amido-, cyano-, chloro-, or silane-substituted derivatives thereof.

3. The process of claim 2 wherein said polymerizable monomer is triethyleneglycol dimethacrylate, tetraethyleneglycol dimethacrylate, polyethyleneglycol dimethacrylate, or hydroxyethyl methacrylate.

4. The process of claim 1 wherein said sulfimide is o-benzoic sulfimide.

5. The process of claim 1 wherein said aromatic tertiary amine is selected from the group consisting of N,N-dimethylaniline, N,N-diethylaniline, p-isopropyl- N,N-dimethylaniline, N,N-dimethyl-p-toluidine, 2,4-dimethyl-N,N-dimethylaniline, 3,5-dimethyl-N,N-dimethylaniline, and mixtures thereof.

6. The process of claim 5 wherein said aromatic tertiary amine is a mixture of N,N-dimethyl-p-toluidine and N,N-diethylaniline.

7. The process of claim 1 wherein said chelator is oxalic acid or tetrasodium ethylenediamine tetraacetic acid.

8. The process of claim 1 wherein said sulfimide is present in an amount of 0.01 to 12% by weight and said amine is present in an amount of 0.01 to 3% by weight, based on total composition.

9. The process of claim 1 wherein said inhibitor is present in an amount of 0.0025 to 0.05% by weight, based on monomer.

10. The process of claim 1 wherein said chelator is present in an amount of 0.001 to 0.01% by weight, based on total composition.

11. The process of claim 1 wherein there is additionally present in said mixture a thickener.

12. The process of claim 1 wherein there is additionally present in said mixture a dye and a fluorescent agent.

13. The process of claim 1 wherein in step (b) said mixture is heated at about 45°–70° C.

14. The process of claim 1 wherein in step (b) said mixture is heated at said temperature for said period of time without stirring thereof.

15. The process of claim 1 wherein in step (b) said mixture is heated at said temperature for said period of time with stirring thereof.

16. The process of claim 15 wherein said mixture is heated at a temperature at 45°–70° C. for 10–24 hours.

* * * * *